(12) United States Patent
Kirst et al.

(10) Patent No.: US 9,091,527 B2
(45) Date of Patent: Jul. 28, 2015

(54) WIRE CORE DIAMETER TESTING SYSTEM AND METHOD

(75) Inventors: Michael A. Kirst, Pewaukee, WI (US); Harold J. Keene, Waukesha, WI (US)

(73) Assignee: Artos Engineering Company, Brookfield, WI (US)

( * ) Notice: Subject to any disclaimer, the term of this patent is extended or adjusted under 35 U.S.C. 154(b) by 297 days.

(21) Appl. No.: 13/103,209

(22) Filed: May 9, 2011

(65) Prior Publication Data
US 2011/0279134 A1    Nov. 17, 2011

Related U.S. Application Data

(60) Provisional application No. 61/333,418, filed on May 11, 2010.

(51) Int. Cl.
    *G01R 27/08*      (2006.01)
    *G01B 7/12*      (2006.01)

(52) U.S. Cl.
    CPC .................................. *G01B 7/12* (2013.01)

(58) Field of Classification Search
    CPC ...................................................... G01R 27/08
    USPC ......... 324/228–231, 539–544, 635, 644, 671, 324/716, 600, 691, 693, 699; 30/91.2
    See application file for complete search history.

(56) References Cited

U.S. PATENT DOCUMENTS

| | | | | |
|---|---|---|---|---|
| 4,166,315 A | * | 9/1979 | Gudmestad et al. | 29/564.4 |
| 5,348,208 A | * | 9/1994 | Tamura | 226/24 |
| 5,934,161 A | * | 8/1999 | Keene | 81/9.51 |
| 7,607,217 B2 | * | 10/2009 | Ruchti | 29/749 |
| 2002/0166236 A1 | * | 11/2002 | Bernardelle et al. | 30/91.2 |
| 2003/0128037 A1 | * | 7/2003 | Christopherson et al. | 324/543 |
| 2004/0027141 A1 | * | 2/2004 | Oguri | 324/716 |
| 2005/0077908 A1 | * | 4/2005 | Fessenden | 324/543 |
| 2010/0294823 A1 | * | 11/2010 | Kirst et al. | 226/177 |
| 2010/0295327 A1 | * | 11/2010 | Kirst et al. | 294/106 |

\* cited by examiner

*Primary Examiner* — Arleen M Vazquez
*Assistant Examiner* — Brent J Andrews
(74) *Attorney, Agent, or Firm* — Andrus Intellectual Property Law, LLP (57) ABSTRACT

A wire processing machine includes a signal applicator that applies a sensing signal to a section of wire. When the signal applicator is applying the sensing signal to the wire core of a section of wire, the wire processing machine is actuated to move a pair of wire processing blades until the wire processing blades contact the wire core. When the blades contact the wire core, the wire core is grounded, which is sensed by the control unit of the device. The position of the wire processing blades when the wire core is grounded is used to determine the diameter of the wire core.

15 Claims, 6 Drawing Sheets

FIG. 6

WIRE CORE DIAMETER TESTING SYSTEM AND METHOD

CROSS-REFERENCE TO RELATED APPLICATION

The present application is based on and claims priority to U.S. Provisional Patent Application Ser. No. 61/333,418 filed on May 11, 2010, the disclosure of which is incorporated herein by reference.

BACKGROUND OF THE INVENTION

The present disclosure generally relates to a system to determine the diameter of a conductive core of a wire. More specifically, the present disclosure relates to a method and system that applies a sensing signal to the conductive wire core and moves a pair of wire processing blades toward the wire core to determine when the wire core becomes grounded by the wire processing blades.

Electric wire, which can be used in many different applications, typically includes a conductive wire core surrounded by an insulating sheath. The conductive wire core is typically made from a metallic material that has a generally known diameter. During processing of the electric wire, automated machines are used to cut the wire to desired lengths depending upon the specific application for the wire. In some scenarios, a portion of the electric wire needs to be stripped of the insulating sheath to expose the conductive wire core, such as to attach an end terminal.

Wire processing machines typically include a pair of wire processing blades that move toward each other to either cut or strip the wire as desired. In an application in which the insulating sheath is removed from a portion of the wire, the wire processing blades move toward each other and cut the insulating sheath. However, the wire processing blades remain spaced from each other by the diameter of the conductive wire core to prevent cutting of the wire core.

As can be understood by the above, it is important to know the diameter of the wire core in a processing application in which the insulating sheath is removed, since the wire processing blades must be moved close enough together to sever the insulating sheath without damaging the wire core. Typically, the diameter of the wire core is entered into the wire processing system, which controls the movement of the wire processing blades. If the wire processing blades come too close together and sever the conductive core, the movement of the wire processing blades can be manually adjusted by an operator. However, this step requires additional processing time and often results in wasted raw materials.

SUMMARY OF THE INVENTION

The present disclosure relates to a testing system and method that can enable a wire processing machine to automatically or semi-automatically determine the core diameter of a wire. The general principal of the disclosure is that the core of the wire is connected to a sensing signal and the wire processing blades of the cutting and stripping machine are moved toward the wire until the electrical sensing signal applied to the wire core is grounded out. At this point, the control unit stores the position of the wire processing blades as the core diameter. In this concept, the stripping/cutting blades must be electrically grounded, which is normally the case for all wire processing machines. In one embodiment, the sensing of grounding the sensing signal is determined by sinking an input on the controller input/output board. However, various other methods are contemplated as being within the scope of the present disclosure.

The process to measure the core diameter is carried in accordance with the present disclosure as follows. Initially, a mode is selected in the software of the control unit to measure the core diameter. Once this mode has been selected, a sensing signal is directly introduced into the wire core by a direct contact with the wire core. This direct contact is carried out with a signal applicator that can be either manually or automatically operated. Once the sensing signal is applied to the wire core, the wire processing blades close, puncturing the wire insulation, until the blades touch the wire core. Once the blades contact the wire core, the wire core is grounded, which is sensed by an input to the control unit. When the wire processing blades contact the wire core, the control unit determines the distance between the wire processing blades, which is then assigned as the dimension of the wire core.

The signal applicator includes a pair of wire gathering jaws that initially close to secure the wire. Once the wire is secured, a piercing pin punctures the wire insulation until the piercing pin contacts the wire core. The sensing signal is applied to the wire core through the piercing pin. The two-stage device of the signal applicator requires that the piercing pin be electrically insulated from ground.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
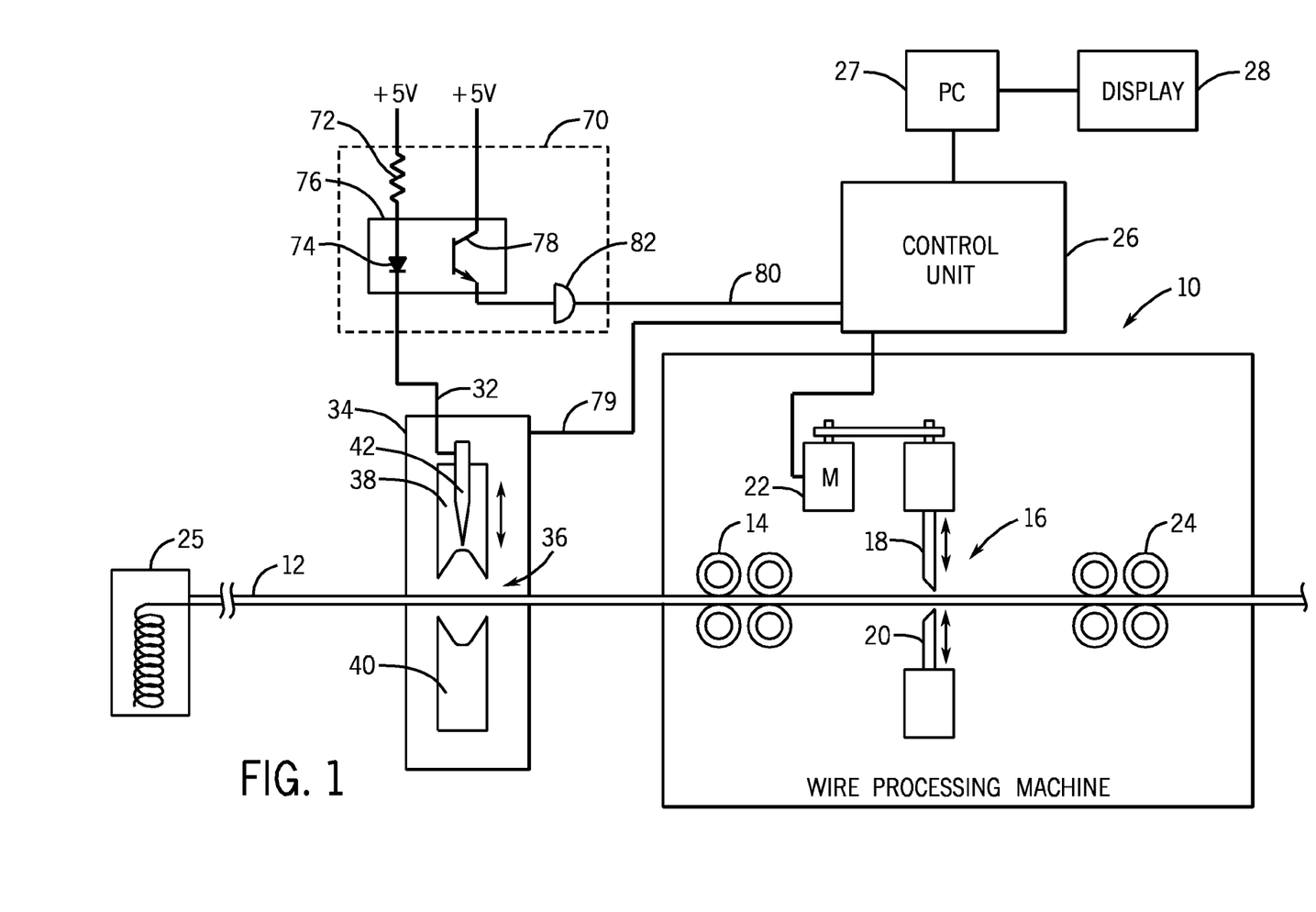
FIG. 1 is a view of a wire processing machine including a controller and a signal applicator.

FIG. 1 illustrates a wire processing machine 10 that includes components that allow the wire processing machine 10 to detect the diameter of a conductor of a wire 12. The wire processing machine 10 generally includes a first advancing device 14, a cutting assembly 16 including first and second wire processing blades 18, 20 each movable by a motor 22, and a second advancing device 24. The first advancing device 14 pulls the supply of wire 12 out of a wire storage location 25 and advances the wire through the wire processing machine 10 which utilizes the cutting assembly 16 to cut and strip the wire to the desired length. The wire processing blades 18, 20 can be stripping and/or cutting blades depending upon the configuration of the wire processing machine 10 and the current requirements for the wire processing machine.

Figure 6:
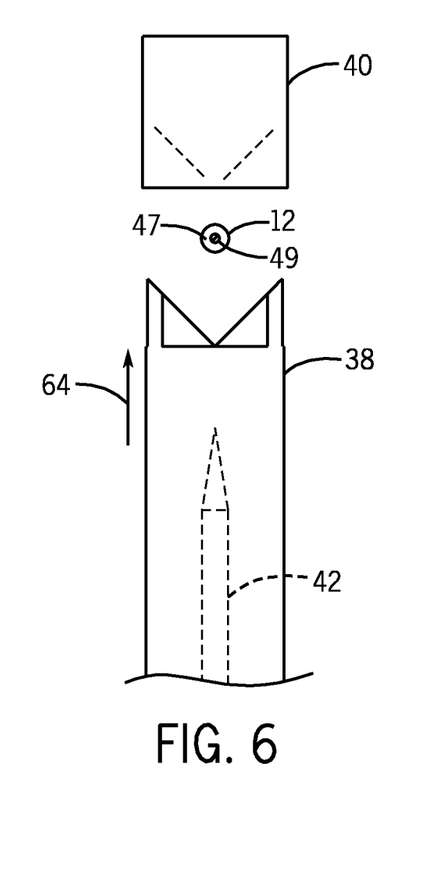
FIG. 6 is a schematic illustration of the signal applicator in its retracted position.

As shown in FIG. 6, the wire 12 normally consists of a wire core conductor 49 that is surrounded by an electrically insulating sheath 47. To process the wire, it is essential to know the diameter of the wire core conductor 49 contained within the electrically insulating sheath 47. The diameter of the wire core is important, especially in applications in which the wire processing device includes an insulation-stripping cutter that removes the insulation from a portion of the wire core.

In the embodiment shown in FIG. 1, the wire processing machine 10 includes a control unit 26 that controls the operation of all the components within the wire processing machine 10. As an example, the control unit 26 controls the operation of the first and second advancing devices 14, 24, as well as the activation of the motor 22 that move the upper and lower processing blades 18, 20. The motor 22 could be a stepper motor, a DC motor with feedback or a servomotor. In the embodiment shown in FIG. 1, the single motor 22 controls the movement of the upper and lower wire processing blades 18, 20 toward and away from each other. The upper and lower wire processing blades 18, 20 are linked to each other such that the blades move toward and away from each other in a linked manner. As described previously, when the wire processing machine 10 is used in an application in which the insulating sheath is removed from the conducting wire core, it is critical to control the movement of the wire processing blades 18, 20 such that the wire processing blades cut through the insulating sheath but do not sever the wire core.

The control unit 26 controls the movement of the blades 18, 20 through activation of the motor 22 and determines the position of the blades based upon monitoring the rotational movement of the motor through an encoder, resolver or other measuring device. In the embodiment shown in FIG. 1, the control unit 26 is a PLC that communicates with a personal computer 27 having an internal processor and a display screen 28. Although the control unit 26 is shown and described as being a PLC, it should be understood that the control unit 26 could be other types of devices while operating within the scope of the present disclosure.

As described above, it is important for the control unit 26 to know the diameter of the wire core of the wire 12, since the final operating position of the upper and lower wire processing blades 18, 20 is dependent upon the diameter of the wire core.

In accordance with the present disclosure, the system and method shown in FIG. 1 applies an electric sensing signal to the wire core of the wire 12 and closes the upper and lower wire processing blades 18, 20 until the metal blades 18, 20 contact the wire core, which results in grounding of the wire core. When the wire core is grounded, the sensing signal applied to the wire core is grounded out, which is detected by the control unit 26. Since the control unit 26 accurately moves the wire processing blades 18, 20 through the motor 22, the control unit 26 can accurately determine the diameter of the center conductor based upon the position of the wire processing blades when the electric signal is grounded out.

As illustrated in FIG. 1, the control unit 26 is connected to a signal generating circuit 70. The signal generating circuit 70 is connected to a 5-volt power supply through an input resistor 72. The input resistor 72, in turn, is connected to diode 74 of an opto-coupler 76. Diode 74, in turn, is connected to a signal supply wire 32. The signal supply wire 32 is connected to a signal applicator 34. In the embodiment shown in FIG. 1, the signal applicator 34 is positioned upstream from the wire processing machine 10 and is shown as a separate component from the wire processing machine 10. The signal applicator 34 communicates with the control unit along control wire 79 such that the control unit 26 can control the activation of the signal applicator 34. However, it should be understood that the signal applicator 34 could be integrated directly into the wire processing machine 10 while operating within the scope of the present disclosure.

In the embodiment shown in FIG. 1, the signal applicator 34 includes a wire gathering device 36 that includes a first jaw member 38 and a second jaw member 40. The first and second jaw members 38, 40 engage the wire 12 to hold the wire securely in position. The first jaw member 38 further includes a piercing pin 42 that is movable relative to the first jaw member 38. The piercing pin 42 includes a sharp point 44 that is able to pierce the insulation contained on the wire 12. The piercing pin 42 is preferably a metallic member that is electrically isolated from the first jaw member 38 and in communication with the signal generating circuit 70 through the signal supply wire 32.

Figure 7:
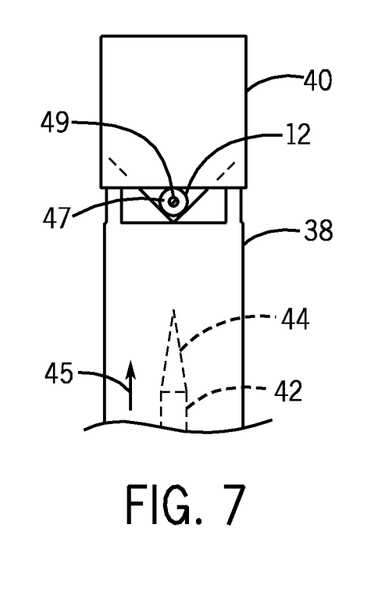
FIG. 7 is a schematic illustration showing the wire gripping jaws engaging and holding the wire.
Figure 8:
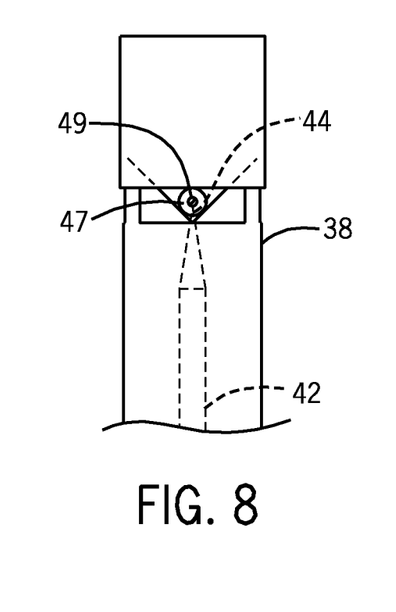
FIG. 8 is a schematic illustration of the movement of the piercing pin to contact the wire core and apply the sensing signal to the wire core.

During operation of the signal applicator 34, the wire gathering device 36 closes to hold the wire 12 between the first and second jaw members 38, 40, as shown in FIGS. 6 and 7. Once the wire is securely held, as shown in FIG. 7, the piercing pin 42 moves in the direction shown by arrow 45 until the point 44 contacts the outer insulation 47 of the wire 12. Once the point 44 contacts the insulation 47, the sharpened point 44 pierces the insulation 47 until the piercing pin 42 contacts the center wire core 49 of the wire 12 as shown in FIG. 8. When the piercing pin 42 has contacted the center wire core 49, the wire core 49 is electrically connected to the 5-volt power supply through the diode 74 and resistor 72, as shown in FIG. 1. However, since the wire 12 is not grounded, current does not immediately flow through the resistor 72 and the diode 74 from the power supply.

In the embodiment shown in FIG. 1, both of the wire processing blades 18, 20 are grounded such that when the blades contact the wire core of the wire 12, the wire core is grounded. When the wire core is grounded, the 5-volt power supply is connected to ground and the sensing signal from the signal generating circuit 70 has a path to ground through the wire core.

When the wire core of the wire 12 is grounded, current flows through the resistor 72 and the diode 74. Diode 74 generates optical signals that in turn are received by the transistor 78. The transistor 78 enters a conductive state and the 5-volt power supply is applied to the input pin 80 of the control unit through a logic circuit 82. Although the details of the signal generating circuit 70 are shown in FIG. 1 as one example of a circuit for applying a signal to the wire core, it should be understood that various other signal generating circuits could be utilized while operating within the scope of the present disclosure. In general, the signal generating circuit provides a low voltage, current limited signal to the wire core and senses when the signal is grounded, which is relayed to the control unit. In the embodiment illustrated in FIG. 1, the initial contact between the wire processing blades 18, 20 and the wire core creates a signal or a change in a signal that can be detected by the control unit such that the control unit 26 is made aware that the wire processing blades have contacted the wire core.

When the control unit 26 determines that the wire core is grounded by the wire processing blades 18, 20 coming into electrical contact with the conductor wire core, the control unit 26 determines and stores the position of the processing blades by knowing the amount of movement of the motor 22. Since the motor 22 is an accurate, monitored device, the control unit 26 determines the diameter of the wire core conductor based on the position of the processing blades 18, 20. In this manner, the system and method of the present disclosure is able to determine the diameter of the wire core through the use of the signal applicator 34.

Figure 2:
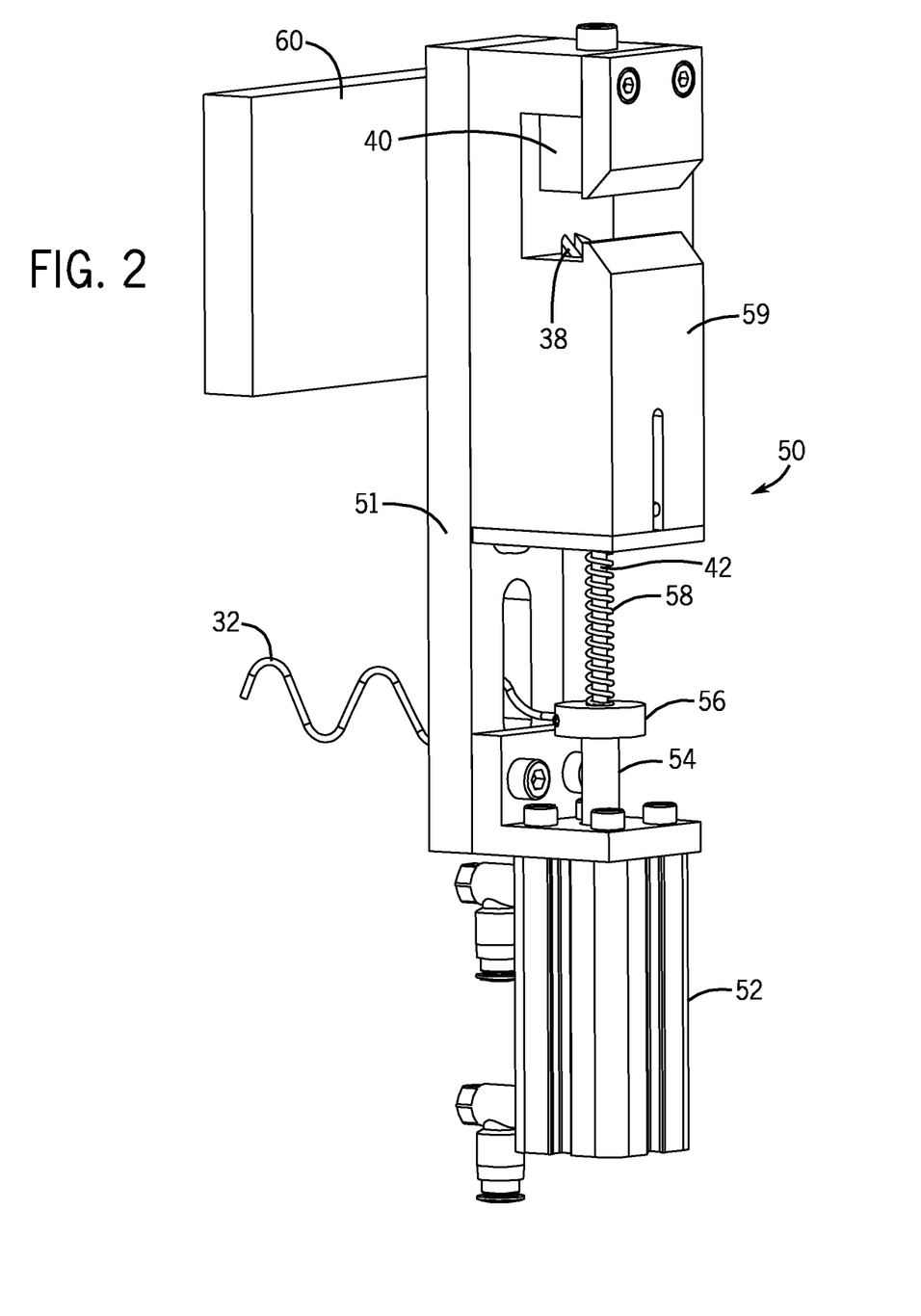
FIG. 2 is a perspective view of one embodiment of the signal applicator of the present disclosure.

FIG. 2 illustrates one contemplated embodiment of an automated signal applicator 50. The automated signal applicator 50 includes an air cylinder 52 that is operable to extend a piston 54 to move a plunger head 56 and the attached piercing pin 42 against the bias force created by spring 58.

As illustrated in FIG. 2, the piercing pin 42 enters into a mounting block 59 which is connected to a support rail 60. The support rail 60 positions the entire signal applicator 50 upstream from the wire processing machine 10 as was discussed in FIG. 1.

Referring back to FIG. 2, the mounting block 59 provides a stationary point of attachment for the stationary second jaw member 40. In the embodiment shown in FIG. 2, the stationary second jaw member 40 is positioned above the movable first jaw member 38. However, the orientation of the first and second jaw members 38, 40 can be inverted based upon the amount of room available for mounting the signal applicator 50. As illustrated in FIG. 2, the signal supply wire 32 passes through an opening formed in support bracket 51. As will be described in detail below, the signal supply wire 32 is connected to the piercing pin 42 through the plunger head 56.

Figure 3:
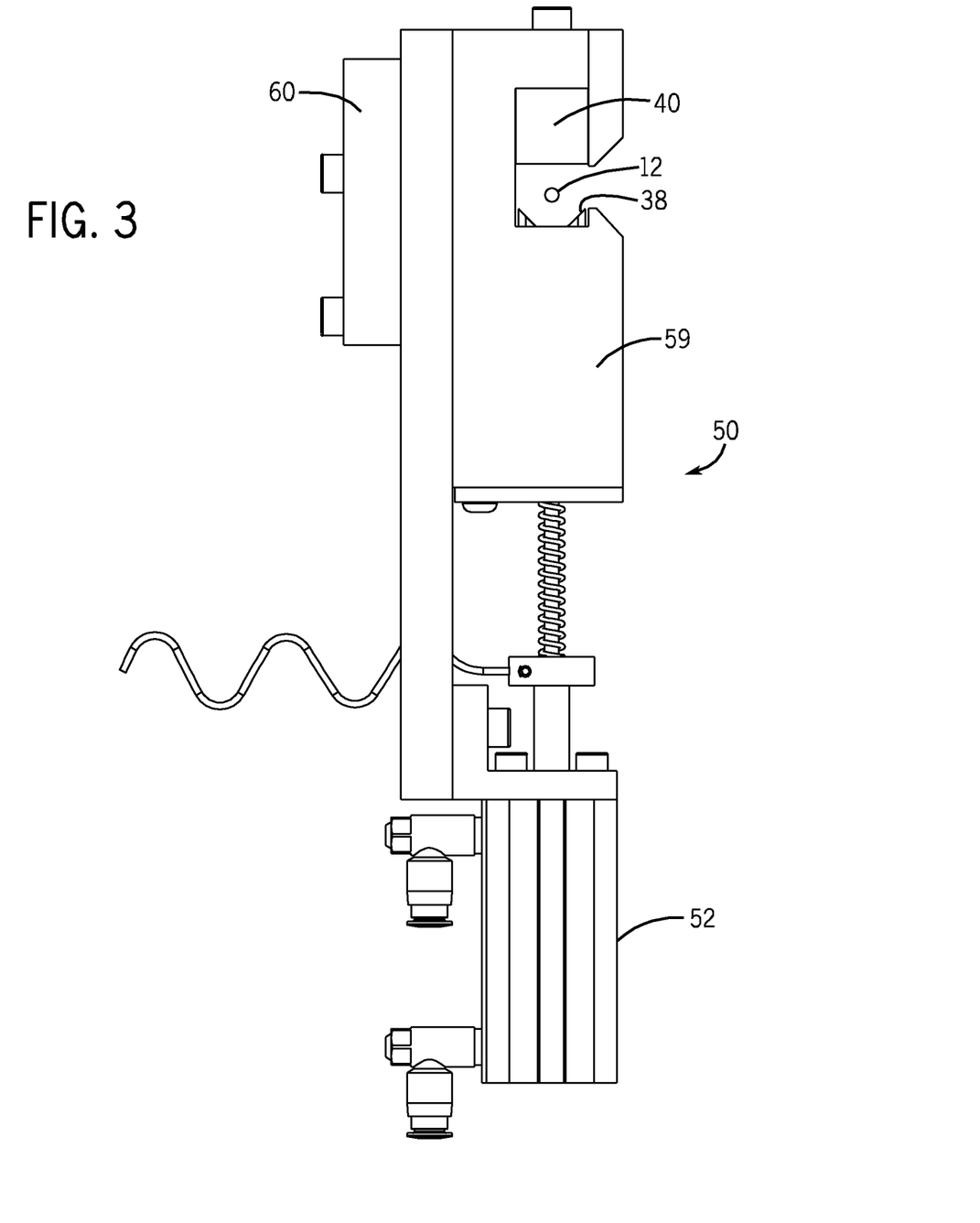
FIG. 3 is a side view of the signal applicator shown in FIG. 2.

As illustrated in FIG. 3, wire 12 passes between the stationary second jaw member 40 and the movable first jaw member 38 during normal wire processing.

Figure 4:
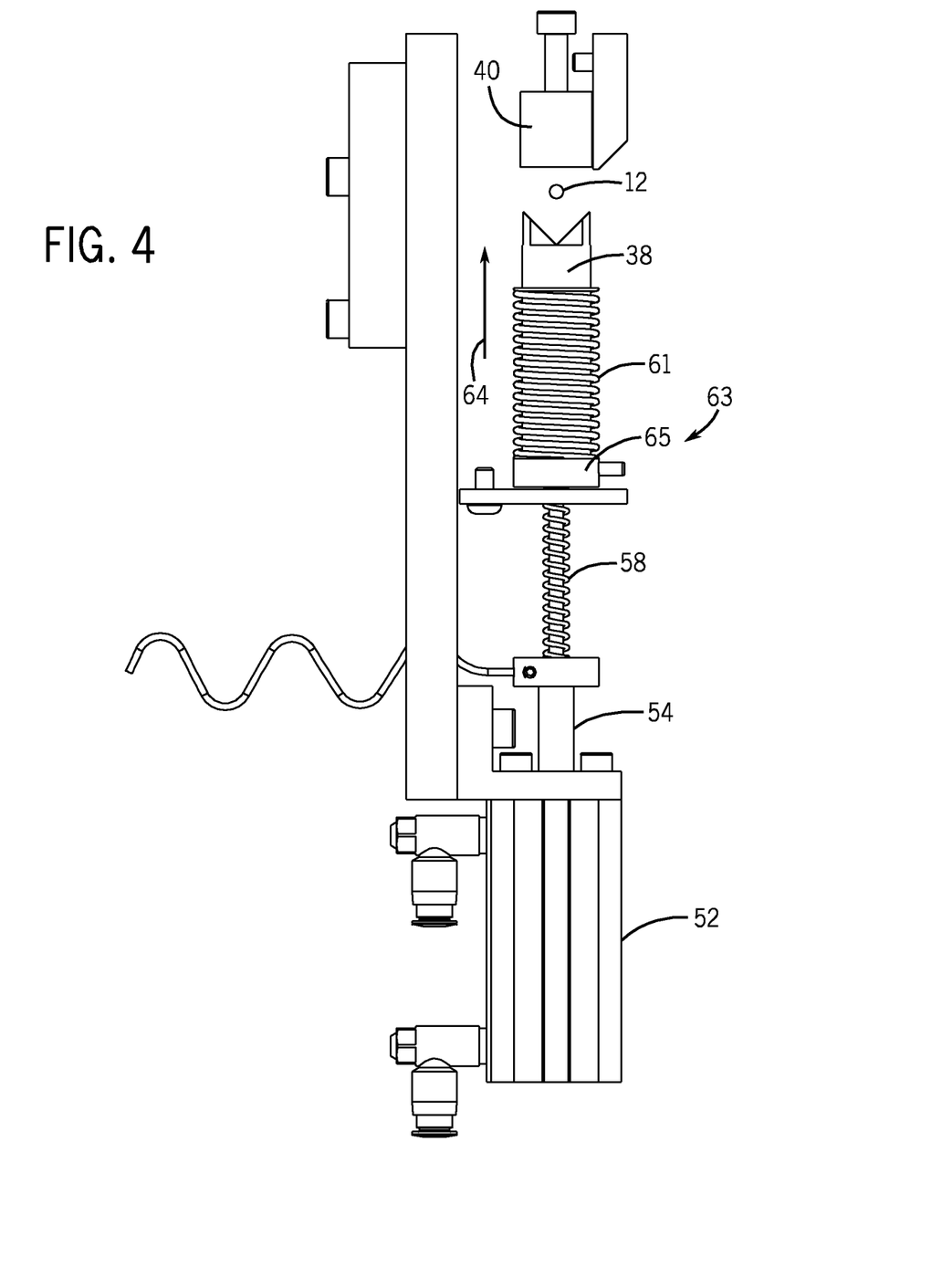
FIG. 4 is a side view of the signal applicator with the outer housing removed showing the position of the pair of wire gathering jaws.

FIG. 4 is an illustration similar to FIG. 3 with the mounting block 59 removed. As can be understood in FIG. 4, the first jaw member 38 is surrounded by a second bias spring 61. The second bias spring 61 holds the first jaw member in the retracted position shown in FIG. 4.

Figure 5:
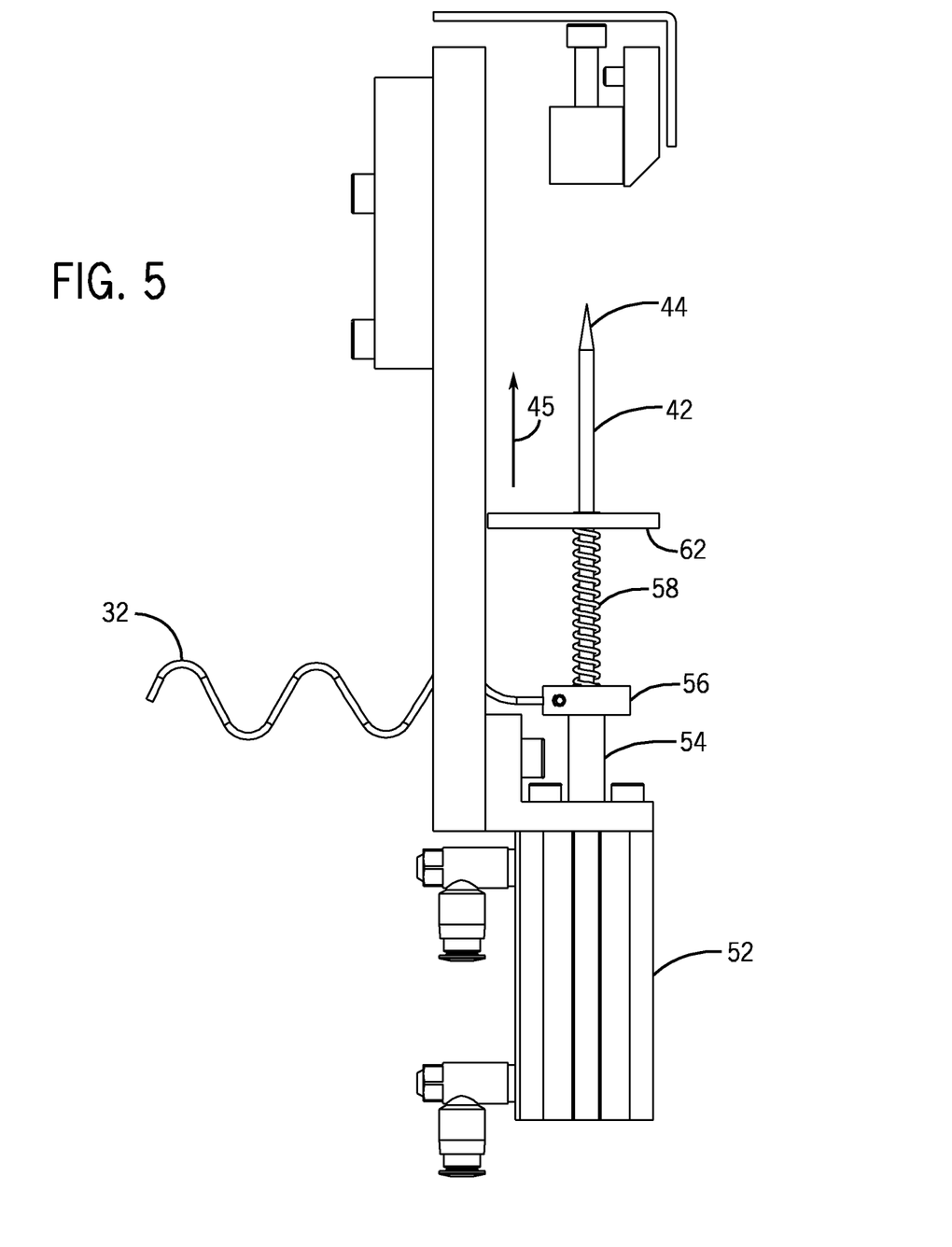
FIG. 5 is a side view similar to FIG. 4 with the lower wire gathering jaw removed illustrating the position of the piercing pin.

FIG. 5 is an illustration similar to FIG. 4 with the first jaw member 38 removed. As illustrated in FIGS. 4 and 5, the piercing pin 42 extends through plate 62 and the mounting collar 65. The mounting collar 65 is used to compress spring 58 between the plunger head 56 and the mounting collar 65. When the air cylinder 52 is actuated, the piston 54 extends, which moves the piercing pin in the direction shown by arrow 45. As discussed previously, the signal supply wire 32 is connected to the piercing pin 42 through the plunger head 56. In this manner, electrical signals on the signal supply wire 32 are supplied to the piercing pin 42.

Referring now to FIGS. 6-8, the movement and operation of the signal applicator 50 will be described. Initially, the air cylinder 52 is activated to move the piston 54 upward against the bias force created by bias spring 61 shown in FIG. 4. Bias spring 61 is configured to create a smaller bias force than bias spring 58. Thus, during the initial activation of the air cylinder 52, the first jaw member 38 moves upward in the direction shown by arrow 64 in FIGS. 4 and 6. The first jaw member 38 continues to move upward until the first jaw member 38 begins to engage the second jaw member 40.

Once the first jaw member 38 entraps the wire 12 between the first jaw member 38 and the second jaw member 40, the wire 12 is held in place securely as shown in FIG. 7. The bias spring 61 shown in FIG. 4 prevents the air cylinder 52 from crushing the wire 12.

When the wire is held securely in place as shown in FIG. 7, the piercing pin 42 is initially in the retracted position shown in FIG. 7. However, as the piston 54 of the air cylinder 52 is further extended, the first jaw member 38 remains stationary and the piercing pin 42 begins to move in the direction shown by arrow 45. As the piercing pin 42 continues to move upward, as shown in FIG. 8, the piercing pin 42 slices through the insulation 47 shown in FIG. 8. The piercing pin 42 continues to move upward until the point 44 contacts the wire core 49. Once the piercing pin 42 contacts the wire core 49, the air cylinder holds the piercing pin 42 in the position shown in FIG. 2.

Once the piercing pin 42 is in electrical contact with the wire core 49, the wire processing machine 10 operates to move the wire processing blades 18, 20 toward the wire 12, as shown in FIG. 1. As described above, the wire processing blades 18, 20 are each grounded and once one of the grounded blades contacts the wire core, the wire core is grounded, which is sensed by the control unit 26 through the input pin 80.

In FIG. 2, the automatic signal applicator 50 is configured utilizing an air cylinder 52. However, it should be understood that the air cylinder 52 could be replaced by other types of actuators, such as a motor or solenoid. In either case, the automated actuator is in communication with the control unit such that the control unit can automatically perform a test procedure when desired. In such an embodiment, no operator interaction is required other than possibly to command the process to begin.

In the embodiments shown in the drawing Figures, the signal applicator 34 is positioned external to the machine. Thus, the signal applicator 34 can be added as a retrofit device to machines already in the field. In such an embodiment, the software resident on the control unit will be programmed to detect the diameter of the center conductor based upon the position of the cutting blades when the cutting blades ground the center conductor.

We claim:

1. A method of determining the core diameter of a wire having a wire core surrounded by an insulating sheath, comprising the steps of:

providing a signal applicator having a wire gathering device and a piercing pin movable relative to the wire gathering device;

moving the wire gathering device to grasp the wire;

moving a piercing pin relative to the wire processing device to pierce the insulating sheath and contact the wire core;

applying a sensing signal to the wire core through the piercing pin;

moving a pair of electrically grounded wire processing blades into contact with the insulating sheath of the wire;

moving the pair of wire processing blades toward the wire core;

monitoring for a change in the sensing signal as the wire processing blades move toward the wire core caused by contact between the wire core and the wire processing blades;

determining the position of the wire processing blades upon the change in the sensing signal; and determining the diameter of the wire core based upon the determined position of the wire processing blades.

2. The method of claim 1 wherein the sensing signal is a DC voltage or current.

3. The method of claim 1 wherein the step of moving the wire gathering device includes the step of moving a plunger to move the wire gathering device into contact with the wire.

4. The method of claim 3 wherein the plunger is moved manually.

5. The method of claim 3 wherein the plunger is moved automatically by a control unit of a wire processing device.

6. The method of claim 1 wherein the wire processing blades are grounded through a control unit.

7. The method of claim 1 wherein the piercing pin is electrically insulated from the wire gathering jaw.

8. A method of controlling the position of a pair of wire processing blades relative to a wire having a wire core, the method comprising the steps of:
- applying a sensing signal to the wire core;
- moving the pair of wire processing blades toward the wire core, wherein at least one of the wire processing blades is grounded such that the sensing signal applied to the wire core is changed when the grounded wire processing blade contacts the wire core;
- monitoring for a change in the sensing signal in a control unit caused by contact between the wire processing blades and the wire core;
- determining the position of each of the wire processing blades relative to each other in the control unit upon the sensed change in the sensing signal; and
- determining the diameter of the wire core based on the determined position of the wire processing blades.

9. The method of claim 8 wherein the sensing signal is a voltage applied to the wire core.

10. The method of claim 8 further comprising the step of moving a piercing pin into contact with the wire core to apply the sensing signal to the wire core.

11. The method of claim 10 wherein the piercing pin pierces an insulating sheath of the wire prior to contacting the wire core.

12. The method of claim 8 further comprising the step of securing the wire between a pair of wire gathering jaws prior to applying the sensing signal to the wire core.

13. The method of claim 12 further comprising the steps of:
- moving a piercing pin relative to the wire gathering jaws once the wire is secured by the wire gathering jaws; and applying the sensing signal to the piercing pin.

14. A system for determining the diameter of a wire core of a wire having an insulating sheath surrounding the wire core, the system comprising:
- a pair of wire gathering jaws selectively movable to grasp the wire;
- a piercing pin movable relative to the pair of wire gathering jaws, the piercing pin being operable to pierce the insulating sheath and contact the wire core when the wire is grasped by the pair of wire gathering jaws;
- a signal generator connected to the piercing pin, wherein the signal generator creates a sensing signal supplied to the wire core by the piercing pin;
- a pair of wire processing blades movable to penetrate the insulating sheath and contact the wire core of the wire, wherein at least one of the wire processing blades is grounded;
- a sensing circuit operable to detect a change in the sensing signal caused by contact between the wire processing blades and the wire core; and
- a control unit operable to determine the diameter of the wire core based on the position of the wire processing blades when the change in the sensing signal is detected.

15. The system of claim 14 wherein the sensing signal is an electric current or voltage.

* * * * *